United States Patent [19]

Rocco

[11] 4,096,961
[45] * Jun. 27, 1978

[54] DUAL LOW LIFT TRUCK

[75] Inventor: Jack O. Rocco, Burlington, Mich.

[73] Assignee: Clark Equipment Company, Buchanan, Mich.

[ * ] Notice: The portion of the term of this patent subsequent to Dec. 27, 1994, has been disclaimed.

[21] Appl. No.: 746,908

[22] Filed: Dec. 2, 1976

Related U.S. Application Data

[63] Continuation-in-part of Ser. No. 673,221, Apr. 2, 1976, Pat. No. 4,065,012.

[51] Int. Cl.² ............................................. B60P 1/04
[52] U.S. Cl. ................................. 214/510; 180/14 R
[58] Field of Search ................. 214/510, 514, 82, 71, 214/701 P, 660; 280/43; 180/17 C, 14 R; 172/801; 254/2 R

[56] References Cited

U.S. PATENT DOCUMENTS

| | | | |
|---|---|---|---|
| 3,572,444 | 3/1971 | Scholl | 180/14 R |
| 3,601,210 | 8/1971 | Stedman | 180/14 R |
| 3,661,214 | 5/1972 | Peterson et al. | 172/801 |

OTHER PUBLICATIONS

Moto-Truc Otis Elevator Co., MTP-WJ, May 28, 1976.

*Primary Examiner*—Drayton E. Hoffman
*Assistant Examiner*—Lawrence E. Williams
*Attorney, Agent, or Firm*—John C. Wiessler

[57] ABSTRACT

A powered dual walkie/rider low lift transporter type truck especially for slip sheet pallet handling in which one tractor portion is supported from a single drive-steer wheel at one end, a second tractor portion is supported from a dual caster wheel at a corresponding one end, and load wheels at the other end of each truck are pivoted from a relatively short length L-shaped platform or frame and are actuatable to lift and lower the platform by actuator-linkage means on each truck. The trucks are coupled together lengthwise of adjacent inner sides thereof. A pair of channel members are located intermediate the drive-steer and load wheels of the one truck and between the caster and load wheels of the other truck, each having stop members secured therein and camming or open portions formed at the bottom of the rear flanges. A load supporting relatively long L-shaped platform or frame is mounted in each pair of channel members by pairs of upper and lower guide rollers; each platform overlaps, extends forwardly of and is elevatable in a horizontal plane with the corresponding short platform to transport a load. Lowering either short platform effects a forward tilting of the corresponding long platform to form a ramp thereof with the floor as the upper guide rollers contact the stop members and the lower guide rollers project into the open portions of the rear flanges while the corresponding load wheels project into openings formed in the long platform. A known push-pull device is mounted on the carriage of the long platform of each truck for slip sheet pallet handling. Both independent and dual controls are provided for the push-pull devices of the trucks, and independent rider and pedestrian drive controls are provided on the one tractor portion for the operator of the side-by-side coupled trucks.

14 Claims, 8 Drawing Figures

DUAL LOW LIFT TRUCK

This application is a continuation-in-part of my application Ser. No. 673,221, filed Apr. 2, 1976, now U.S. Pat. No. 4,065,012, common assignee.

BACKGROUND OF THE INVENTION

The field of art to which the invention pertains includes low lift platform transporter trucks, and more particularly devices adapted for tilting and for elevating a relatively small distance above the floor the load support of a pallet or platform type lift truck.

Various methods and devices for handling material on sheet-like or slip sheet pallets which may be drawn onto a load supporting surface of an industrial truck or tractor by gripping an edge portion of the pallet and pulling the load and slip sheet onto the supporting surface, and subsequently releasing the grip on the pallet edge and discharging it and the unit load from the supporting surface, have been known in the art. The load supporting surface must be movable vertically and tiltable forwardly from a horizontal position in order to carry out the slip sheet pallet handling method.

Rider type counterweighted lift trucks having uprights mounted from the forward end have long been used for the handling of loaded slip sheet pallets by means of such push-pull type attachments. A representative push-pull attachment is manufactured by the assignee of this application under the trademark "Pul-Pac", Model B-5. To a limited degree low lift pedestrian or walkie-type transporter trucks have been used heretofore in combination with push-pull type attachments in applications where elevation of the load above a transport position or standard pallet height is not required. Major advantages result from the use of the much lower cost walkie-type truck as compared with a masted rider truck. On such known transporter type truck which is designed to jackknife centrally thereof in order to tilt the load supporting surface so as to be capable of handling slip sheet palletized loads is Model MTP-WJ, manufactured by Otis Elevator Company of Cleveland, Ohio.

Also known is a prior low lift floor level pick up in which hydraulic actuators are adapted to extend and retract longitudinally of the truck trail wheels which are mounted underneath fork tine members for the purpose of tilting the tines to a load pick-up position when retracted and raising the tines to load carrying position when extended. Such a device is disclosed in U.S. Pat. No. 3,495,730. It is not satisfactory partly because design criteria impose on the trail wheel a permissible design in a given truck design which is not capable of both tilting the fork tines to a floor load level pick-up position and raising the fork tines a distance which will enable them to clear wooden pallets and the like in a vertical direction for engagement, deposit and withdrawal of loads on the pallet.

No known prior art couples together a pair of walkie-type transporter trucks for simultaneous side-by-side operation having drive means on a tractor portion and means for controlling simultaneously or independently the push-pull attachments and lifting means of the coupled trucks. My invention is particularly useful in essentially doubling productive capacity over a single unit, increasing efficiency in locating double loads which, for example, substantially equal the inside width of a semi-trailer, or may, of course, be designed to maximize the efficiency in loading and unloading different size containers, warehouse areas, and the like. In addition, it substantially reduces cost by using only a single drive unit and drive controls for the dual truck.

SUMMARY OF THE INVENTION

My invention provides a powered dual walkie/rider type low lift transporter truck in which a first tractor portion is supported from a drive-steer wheel and elevatable load wheels associated with an elevatable relatively short L-frame. A second tractor portion is supported from a caster wheel and elevatable load wheels associated with an elevatable relatively short second L-frame, the tractor portions being coupled together lengthwise of adjacent inner sides thereof. A load handling portion having a relatively long load supporting L-frame is supported on each short L-frame and is coupled to each tractor section by vertical guide means. Each long L-frame overlaps and extends forwardly of each short L-frame which elevates the long L-frame in a horizontal plane and which when lowered in a horizontal plane permits each long L-frame to tilt forwardly to form a ramp while the drive tractor portions may remain in fixed positions.

It is a primary object of the invention to improve low lift platform trucks for handling slip sheet pallets.

DESCRIPTION OF THE PREFERRED EMBODIMENT

Figure 1:
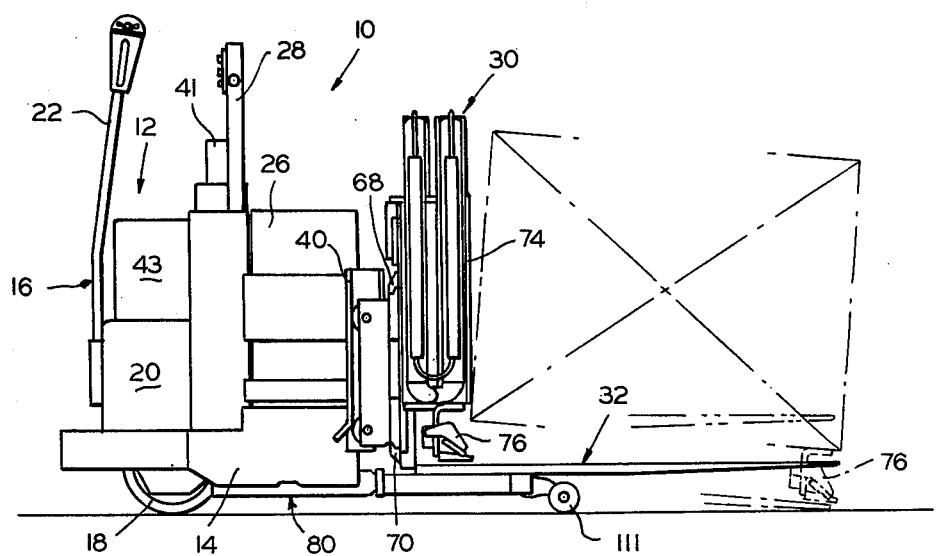
FIG. 1 is a side view in elevation of a dual low lift truck which embodies my invention, taken from the remote side of the drive tractor unit.

Referring now to the drawing, a slip sheet low lift dual transporter truck with a pair of push-pull attachments is shown generally at numeral 10. The traction drive and control portion of the truck is shown at numeral 12; it utilizes generally the configuration and components of assignee's Walkie/Rider HWP Model. It includes a horizontal platform and frame portion 14 in which is mounted a drive head unit 16 which includes a drive-steer wheel 18 supporting an electric drive motor, reduction gear box, brake and control units contained within a housing 20 and supported and guided by circumferentially spaced rollers connected to the drive head unit which engages a circular track, not shown, supported from the platform frame 14. The drive unit 16 is mounted for rotation about the vertical axis of the wheel and drive head unit for steering the wheel 18, all in known manner. A drive control and steering handle 22 is pivotable in both vertical and horizontal directions for pedestrian operated usage as a walkie truck in driving, steering and braking the dual truck. Suitable electrical connections, not shown, extend between a storage battery 26 mounted on the forward end of platform 14 and the drive motor, and an additional T-handle control 18 has suitable controls for operating the push-pull attachment shown generally at numeral 30 and for lifting and lowering a long L-frame or platform assembly 32, being mounted so that an operator can drive, steer and control other operations of the truck while located in a standing position on the rear platform 14 thereof and steering with control handle 22 while controlling speed and braking by means of the controls associated with control handle 28, as well as controlling the handling of slip sheet pallets at the front end of the truck.

Figure 8:
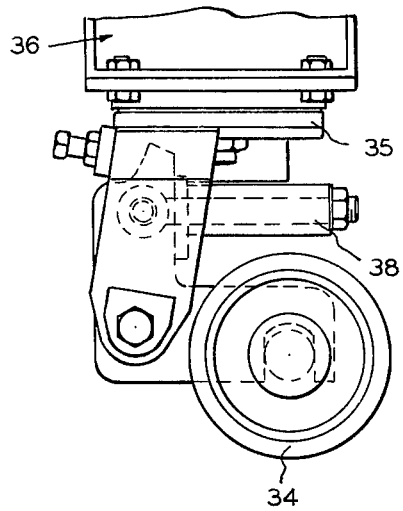
FIG. 8 is a perspective view of the dual-caster wheel of the caster tractor unit.

The non-traction drive truck unit is shown generally at 33, being supported at the rear by a dual caster wheel unit 34 mounted from a thrust bearing 35 which is supported from and secured to a spacer box 36, in turn secured to a transverse truck plate 37. A mounting shaft, spring and lever arrangement 38, as shown in FIG. 8, is adapted to maintain a sprung floor contact condition of the caster wheel assembly The dual caster wheel per se is of conventional construction, and further details thereof need not be described. A second T-handle control 39 is similar to control handle 28, having suitable controls for operating the second push-pull attachment 30' and for lifting and lowering the second long L-frame or platform assembly 32', but not including drive motor and braking controls as are also associated with control handle 28. An additional control station element 41 is preferably mounted on the non-traction drive unit and is operatively connected to both push-pull attachments 30 and 30' and to lifting assemblies for platforms 32 and 32' via hydraulic control units housed within covers 43 and 43' for controlling simultaneously the operation of both push-pull attachments and the lifting and lowering mechanism for platform assemblies 32 and 32', control handles 28 and 39 being adapted to control the same independently one from the other via the same hydraulic units within housings 43 and 43'.

The traction and non-traction units are coupled together in a longitudinal side-by-side relationship by means of a hinge assembly which permits the truck units to articulate in relation to each other about a central longitudinal axis. The hinge assembly comprises a pair of tube spacers 45, one of which is welded to the inner side of platform 14' and the other of which is welded to a spacer block 47' which is secured to a side plate, as shown, of the non-traction unit. A second spacer block 47 is secured to the inner adjacent side of the traction unit to which is welded a tubular member 49, an additional pair of members 49 being welded to the inner side of platform 14 in straddling relationship to tubular member 45, the members 45 and 49 being interconnected by a tubular rod 51 thereby together forming a hinge whereby the tractor units can articulate as aforesaid.

It will be understood that any suitable coupling of the two units may be adopted, such as substituting rubber sandwich mounts between the traction and non-traction units in place of the hinge assembly 45, 47, 49 and 51.

In the description which follows the details of the traction drive unit will be described. It should be understood that the non-traction unit embodies similar detailed structure, and similar parts are identified by primed numerals on the non-traction unit as shown in FIGS. 2 and 3.

A pair of outwardly facing vertical guide means comprising upright channel members 40 are secured, as by welding, transversely outwardly of pairs of vertically spaced forwardly extending plate members 42 which contain the sides of the battery 26 and which are connected together at the front ends by a pair of vertically spaced and transversely extending frame members 44 which contain the battery at the front end.

Figure 4:
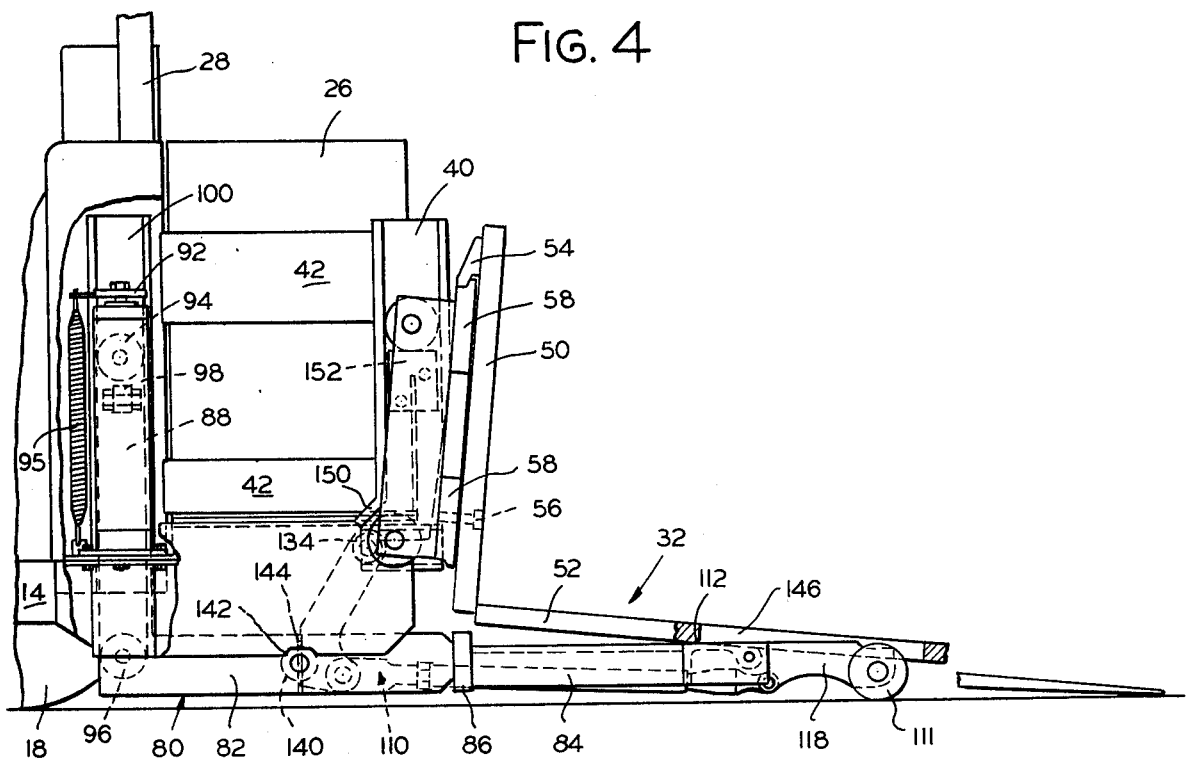
FIG. 4 is an enlarged partially broken away view of a portion of FIG. 1 showing the unit in a lowered position wherein each long L-frame load platform forms a ramp, the tips of which are in contact with the floor for pick-up or discharge of a pair of loads from slip sheet pallets usable with a pair of push-pull attachments.

The generally L-shaped load supporting frame or platform assembly 32 includes a U-shaped vertical plate 50, a relatively long pair of platens or transversely spaced pair of horizontal platform elements 52 secured to opposite side portions of member 50, the latter member having an upper pair of transversely spaced hangers 54 secured to the upper end portions of each leg of member 50 for engaging in known manner a fork bar carriage assembly, as best shown in FIG. 4, which comprises a pair of vertically spaced and transversely extending fork bars 58. Bolts 56 secure the lower portions of plate 50 to lower fork bars 58. Secured across the rear sides of bars 58 is a pair of fork brackets 60, to each of which is mounted upper and lower guide rollers 62 and 64 which engage channels 40 for guiding the vertical and tilting movements of L-frame assembly 32 in a manner to be described.

Figure 2:
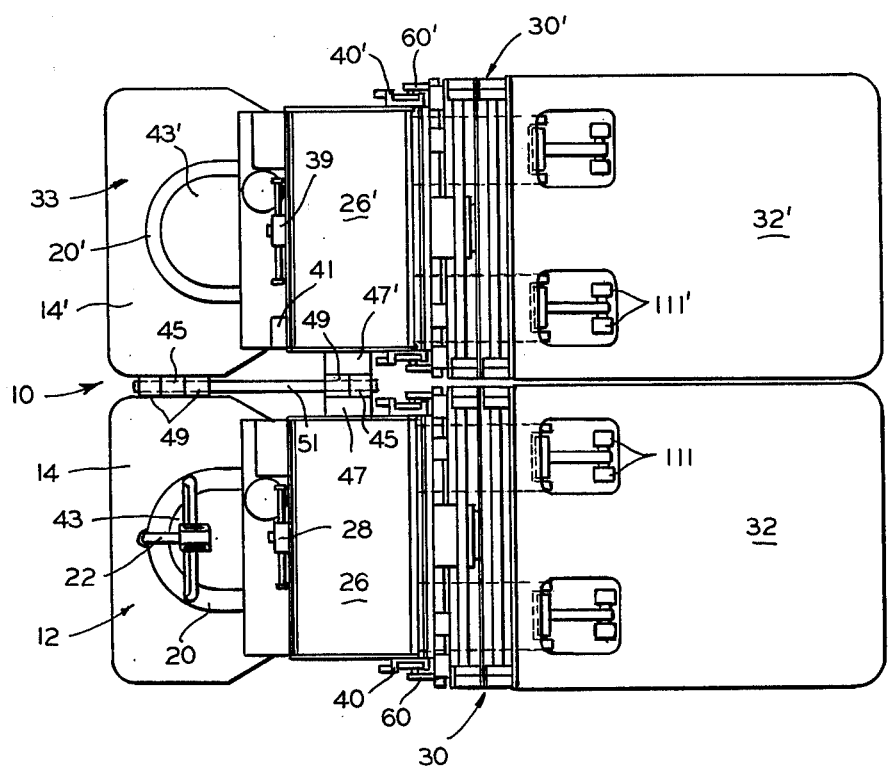
FIG. 2 is a plan view of FIG. 1.
Figure 3:
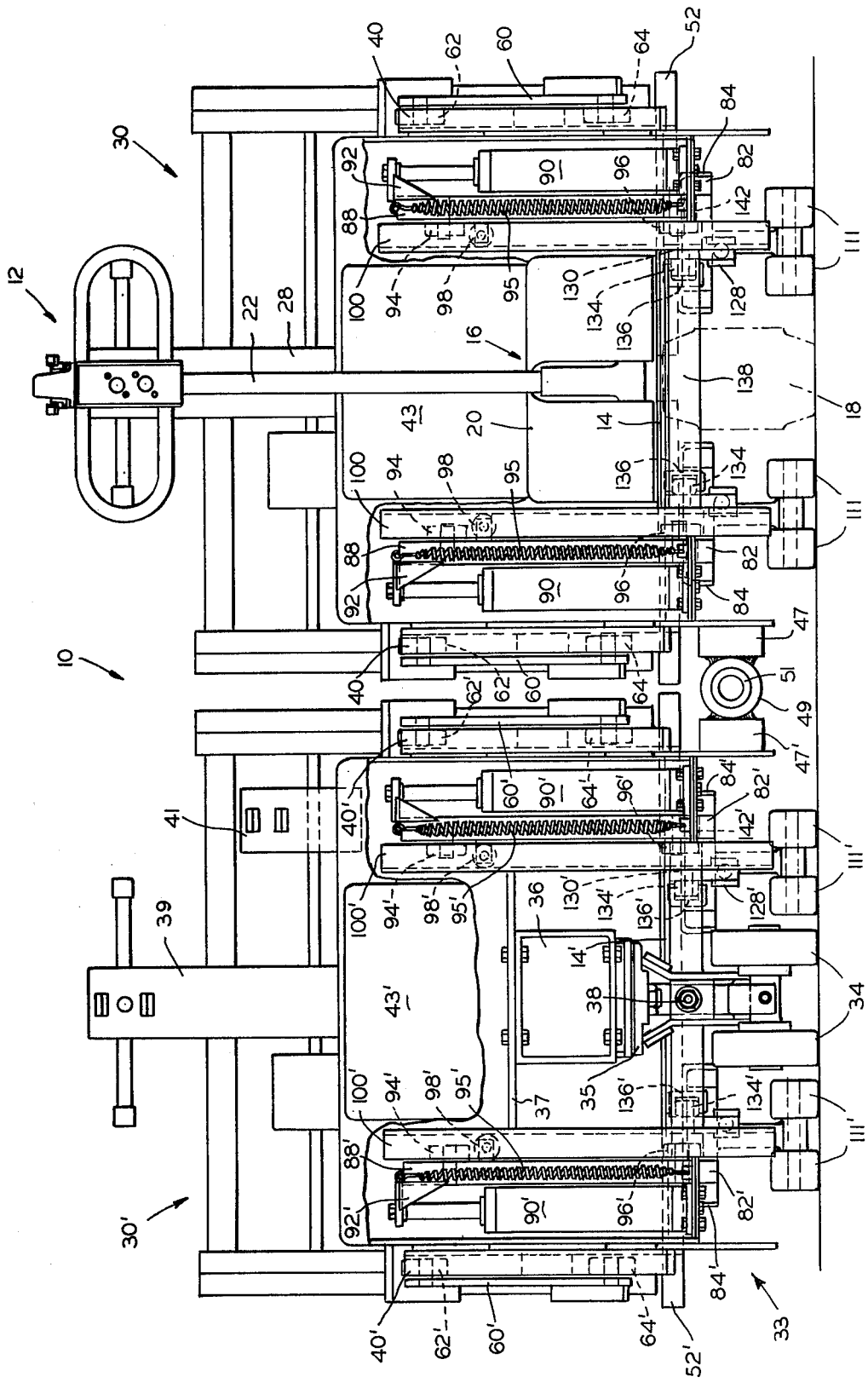
FIG. 3 is an enlarged partial sectional view taken from the rear end of the truck with the long L-frames shown elevated.
Figure 6:
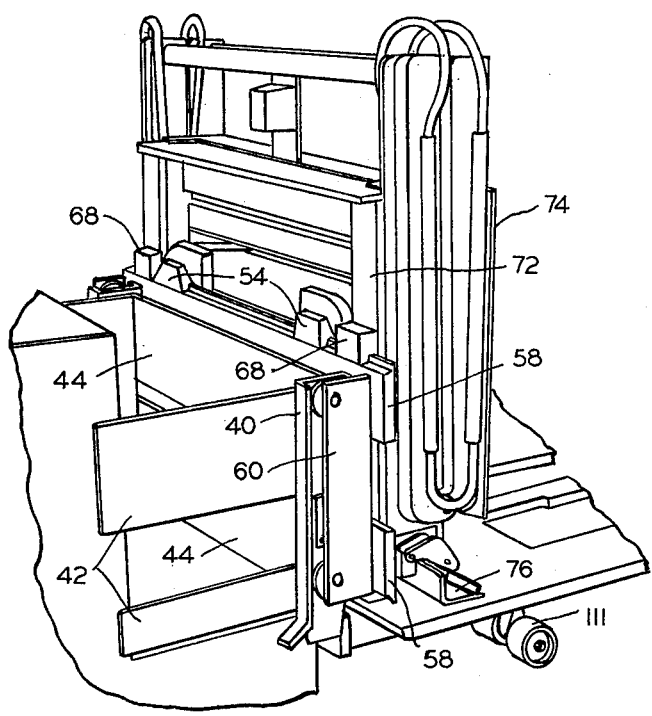
FIG. 6 is a perspective view of the central portion of the drive truck unit.

The push-pull attachment device 30 is shown only in FIGS. 1, 2 and 6, being shown in retracted position in solid lines, and shown diagrammatically extended in broken lines in FIG. 1 with L-frame 32 tilted.

The attachment is not shown in the remaining figures, except in frame outline as seen in FIG. 3, so that the clarity of the drawing is enhanced. As mentioned previously, the attachment may be of assignee's own Model B-5 design, as shown, which is mounted for connection to fork bars 58 in straddling relation to hanger members 54 by pairs of upper and lower hanger and clamp members 68 and 70 which are secured to members of the rear framework 72 of the attachment. The attachment is adapted to be moved at all times in vertical and tilting movements coincident with the similar movements of L-frame assembly 32.

As is well known, in the retracted position of the attachment as shown the pantograph unit is collapsed fully, in which position a load pusher rack 74 may be in contact with the one end of a load, not shown, from which has been drawn onto the horizontal platform 52 by gripper jaw unit 76, from the broken line position shown in FIG. 1, the load being palletized on a slip sheet and, for example, drawn onto the platform 52 as the truck is driven forwardly and the attachment is retracted. To push a unit load from the platform, the pantograph unit may be extended forwardly, for example, as the gripper jaw opens automatically and the truck is simultaneously backed, all as is well known.

A generally L-shaped intermediate elevatable frame assembly 80 interconnects drive unit 12 with L-frame and attachment assemblies 30 and 32 for raising and lowering the latter assemblies in relationship to the drive unit, platform 14, the battery 26 and channels 40. The assembly 80 comprises a pair of transversely spaced and forwardly extending L-shaped members having horizontal leg portions 82 connected to transversely spaced horizontal inverted U-shaped platform leg portions 84, which at the adjacent ends are secured together by a transverse brace member 86, and a pair of transversely spaced vertical legs 88 which extend through openings in platform 14 and which are connected to the rod ends of a pair of laterally spaced hydraulic actuator cylinders 90, supported at the head ends from platform 14, by plates and gussets 92 and by a pair of cylinder return springs 95. Leg portions 84 are also secured together by a plate 85 which forms therewith a forwardly extending U-shaped platform.

Vertical legs 88 are connected for vertical guided movement by upper and lower pairs of guide rollers 94 and 96 and by intermediate side thrust guide rollers 98 to a pair of vertical channel members 100 which also extend through and are edge welded to openings in platform 14, a transverse brace member 102 being secured between the upper web portions thereof to provide a generally H-shaped inner fixed vertical frame for supporting and guiding the short L-frame assembly 80.

Figure 5:
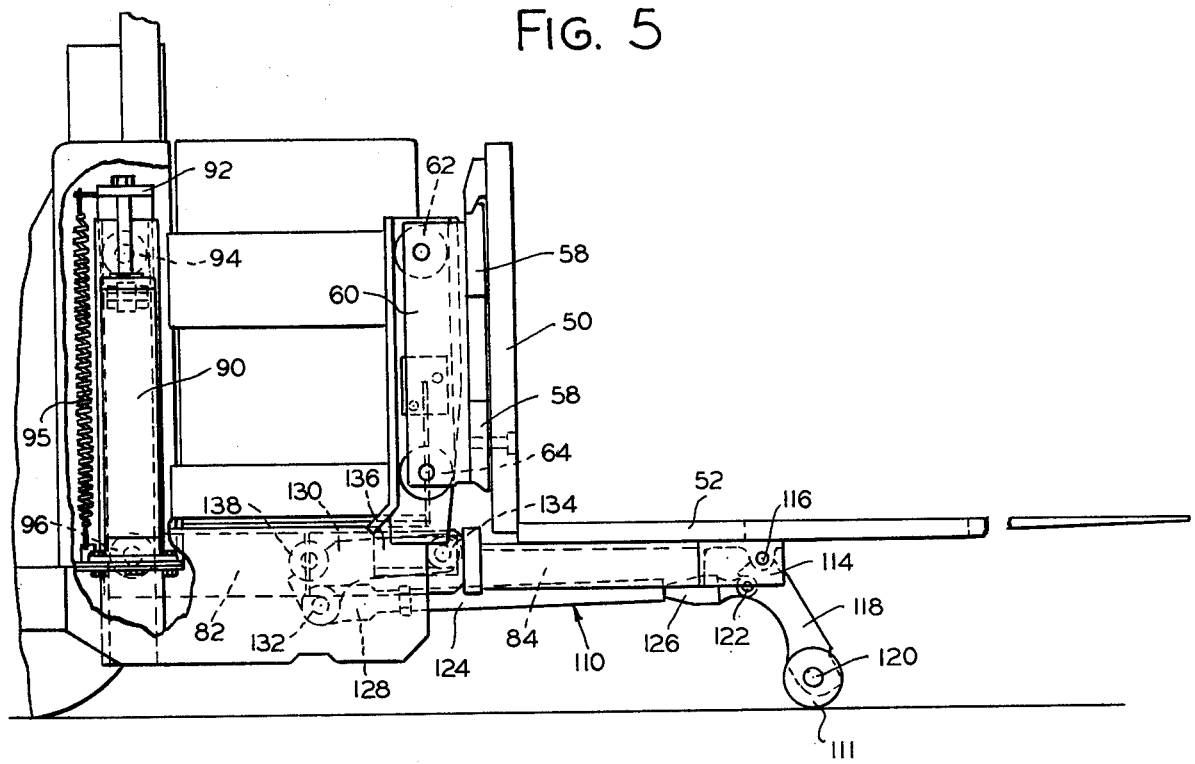
FIG. 5 is similar to FIG. 4 but illustrates the load platforms in elevated positions.
Figure 7:
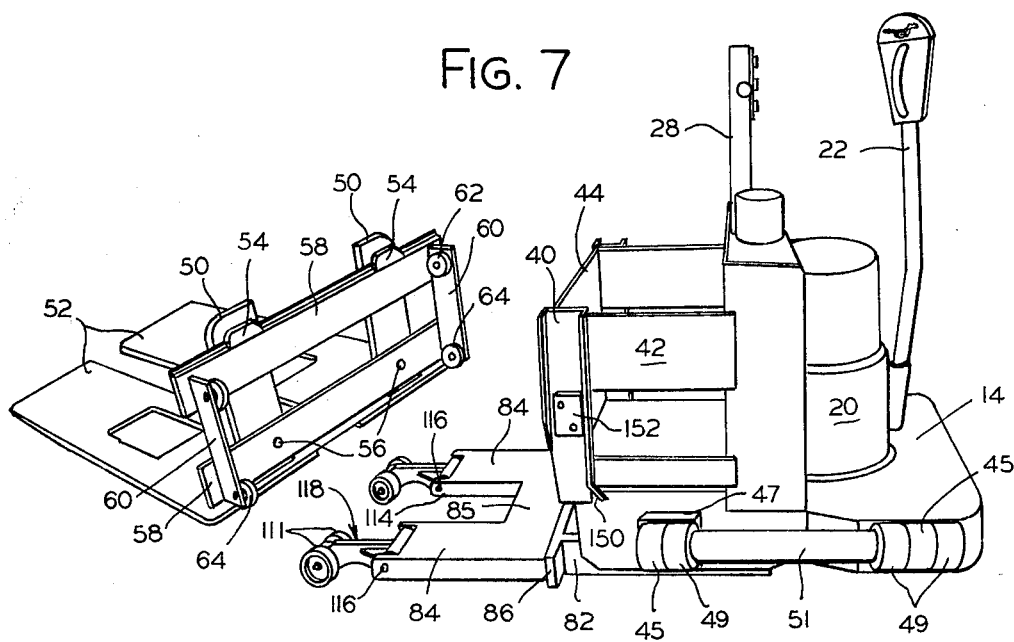
FIG. 7 is a perspecitve view of the drive tractor unit uncoupled from the caster tractor unit taken from the coupling side and showing the long L-frame uncoupled.

A lift linkage assembly shown generally at numeral 110 interconnects pairs of load wheels 111 and L-frame 80 in such a manner as to elevate the L-frame in a horizontal plane during extension of cylinders 90, said L-frame being in continuous supporting engagement with the long load supporting L-frame 32 to elevate the same between the positions shown in FIG. 1 and that shown in FIG. 5, while being also adapted to lower the L-frame 80 such that frame 32 is capable of assuming the ramp position shown in FIG. 4.

L-frame 80 and linkage assembly 110, with an important modification, are similar to the corresponding frame and linkage assembly used in assignee's aforementioned HWP Walkie/Rider Model. Relatively minor modifications adapting the prior design to the present invention comprise the mounting of springs 94 exterior of cylinders 90, rather than interior thereof as heretofore, and the elimination of a fork plate which in the HWP Model extends vertically and forwardly of the battery compartment and is integral with the L-frame. An important modification of the said prior L-frame and lift linkage construction is the use of a relatively short horizontally extending L-frame so that it is possible for the long load supporting L-frame 32 to assume a ramp position, as will be explained more fully below.

As used herein the terms "long" and "short" in relation to the horizontal extent of platforms 80 and 32 are intended to define a relationship between the horizontal legs of the L-frames which permits frame 32 to assume the ramp position shown in FIG. 4 wherein the outer end thereof contacts the load supporting surface or floor while an intermediate portion is supported by the outer end portion of legs 84 as shown at numeral 112.

Each of the inverted U-shaped platform legs 84 has a forwardly extending U-shaped end 114 having openings adapted to receive a pivot pin 116 on which is mounted a lift lever linkage assembly 118 from the outer end of which is mounted on a shaft 120 the pair of load wheels 111, and intermediate the ends of which is secured a pivoted connection 122 of the lift linkage. The lift linkage assembly 110 includes a pair of transversely spaced links 124 having enlarged forward ends 126 and pivotally connected by adjustable yokes 128 at the other ends to the respective one legs of a pair of bellcranks 130 at 132. At the end of the other leg of each bellcrank an inwardly extending guide roller 134 is mounted and is adapted to engage a short facing channel section 136 secured at its upper flange portion to the underside of one side of frame platform 14, the bellcranks being secured, as by welding, to opposite end portions of a transverse torque tube 138 which is also journalled in openings 140 in short L-frame legs 82 at reduced diameter ends 142 and is secured by a transverse pin 144 in each opening 140 such that extension of cylinders 90 from full retraction to maximum extension causes short L-frame 80 to be elevated in a horizontal plane from the position of FIG. 4 to that of FIG. 5 as the motion of bellcrank 130 is guided by channels 136 to retract links 124 causing the load wheels and linkage assemblies 111 and 118 to elevate from the FIG. 4 to the FIG. 5 position. It will be understood that a portion of each link 124 is adapted to nest inside of the respective inverted U-shaped L-frame leg portion 84. The lifting link and bellcrank assemblies are mounted transversely inwardly of each of the vertical legs 88, and of the rear horizontal leg portions 82 of L-frame assembly 80, as best seen in FIG. 3. The purpose of torque tube 138 is, of course, to both rigidify the linkage structure and to insure synchronized lifting movements of the pair of lift linkages. Openings 146 are formed in each long platform leg for the reception of load wheels 82 and a portion of the lift lever 118 when the long L-frame assembly is in a ramp position as shown in FIG. 4.

It will be appreciated that in elevating the short L-frame 80 pressure fluid is directed to cylinders 90 to extend the piston rods and elevate therewith in opposition to springs 94 the L-frame, the vertical legs 88 thereof being guided by rollers 94 and 96 in channels 100 and causing through the operation of torque tube 138 the concurrent elevation of the front end of the L-frame assembly by pairs of load wheels 111 and lift levers and linkages 118 and 124 operated by bellcranks 130 until at maximum elevation the rear portions 82 of the horizontal legs of the assembly abut the underside of frame platform 14, at which position long L-frame assembly 32 and push-pull attachment 30 have been elevated by frame assembly 80 to the FIG. 5 position as pairs of guide rollers 62 and 64 are elevated in guide channels 40. In the FIG. 5 position the long L-frame and carriage assembly 32 with push-pull attachment 30 is elevated for a load deposit or pick-up operation in relation to a slip sheet pallet load on any standard wooden frame pallet, for example.

In order to achieve the ramp position of long L-frame 32 as shown in FIG. 4, I have provided a rearwardly extending open rear flange or camming portion 150 at each channel 40 and a stop block member 152 secured, as by bolts, at a predetermined location in each channel 40 so that with cylinders 90 retracted fully the frame assembly 32 is at its lowermost position with upper rollers 62 abutting block members 152, at which position lower rollers 64 have become disengaged with the rear flanges of channels 40 as they move rearwardly under the force of gravity into the open areas provided by biased flange portions 150. This action permits frame assembly 32 to tilt forwardly into the ramp position of FIG. 4 with the tips of the long platform legs in contact with the floor and preferably supported at 112 by the short L-frame end portion as previously mentioned. In the latter condition, as will be noted in FIG. 4, lower rollers 64 are not in contact with biased flange portions 150, which is preferred. The tilt angle is predetermined mainly by the design relationship between the effective lengths forwardly of fork bars 58 of the horizontal leg portions of the long and short L-frame assemblies, the support of the long L-frame when tilted being at contact areas 112 and between the forward flanges of channels 40, stop blocks 152 and rollers 62. In such position, as previously explained, the push-pull attachment 30 is capable of retrieving onto the long load support platform loads on slip sheet pallets. The openings 146 in the load platform are required so as to maintain the correct wheel base for the desired weight distribution.

It will be noted that in all positions of long L-frame 32, short L-frame 80 remains horizontal (assuming, of course, that the truck is on a horizontal supporting surface), and that the tractor drive end 12 of the truck, including battery 26 and channels 40, is not required to articulate, jack-knife, or otherwise alter its fixed relationship to the movable L-frames and lift linkage assembly. When the lifting assembly is elevated from the FIG. 4 position, as above explained, lower rollers 64 will be forced against the biased flange portions 150 as L-frame 32 is elevated at 112 by L-frame 80. Flange portions 150 then function as camming surfaces to cause said rollers to move upwardly and forwardly into the channels as upper rollers 62 are elevated above stop blocks 152, thereby actuating the load support 32 into a position parallel to the floor and resting fully on the forward leg portions of short L-frame 80.

Although the foregoing detailed description is directed specifically to the traction drive unit, it will be clearly apparent that the structure and operation of the non-traction drive unit coupled thereto is the same as that of the traction drive unit, insofar as is indicated by the use of the same identifying numerals primed. The difference in the caster tractor unit is in the use of the dual caster wheel 34 in substitution of the drive motor and controls, and the addition of dual push-pull control 41. The use of two batteries 26 and 26' of equal capacity is preferred, even though battery 26' is not connected to the traction drive circuit of unit 12. Battery 26' may be used, for example, as a spare battery in place of battery 26 during recharging of the latter.

Although I have described and illustrated a preferred embodiment of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. In a dual low lift powered truck, a tractor drive portion having a main frame, a tractor non-drive portion having a main frame, coupling means connecting said tractor portions in side-by-side relation for operation as a single dual unit truck, hydraulic actuator means and guide means supported from and rearwardly of the forward end portion of each of said main frames, vertical guide means supported from a forward end portion of each of said frames, a pair of relatively short L-frame assemblies having a horizontal leg portion extending beneath and forwardly of respective ones of said main frames and a corresponding vertical leg portion actuatable by said hydraulic actuator means for guided vertical movement, a pair of elevatable load wheel means and actuator assemblies connected to respective ones of said L-frame assemblies and cooperating with said hydraulic actuator means to raise and lower said L-frames bodily vertically, and a pair of relatively long L-frame assemblies coupled with respective ones of said vertical guide means for guided vertical movement in at least a portion of the movement thereof, said long L-frames overlapping, extending forwardly of and elevatable by said short L-frames.

2. A lift truck as claimed in claim 1 wherein said hydraulic actuator means and guide means includes other vertical guide means, and said vertical leg portion of each short L-frame extends through the respective main frame for guided vertical movement in said other vertical guide means.

3. A lift truck as claimed in claim 1 wherein each said vertical guide means is so constructed as to permit each long L-frame to tilt forwardly out of the plane of each short L-frame upon lowering of the respective short L-frame.

4. A lift truck as claimed in claim 3 wherein openings are formed in the horizontal leg portion of each long L-frame into which said load wheel means project when the respective long L-frame is thus tilted.

5. A lift truck as claimed in claim 3 wherein each long L-frame tilts forwardly to form a ramp with the floor, and a push-pull attachment supported from each long L-frame for engaging floor supported slip sheet pallets when the respective long L-frame is thus tilted.

6. A lift truck as claimed in claim 3 wherein each vertical guide means includes stop means and cam means, said stop means and forward end portion of each short L-frame supporting the respective long L-frame in said tilted position, and said cam means permitting movement of the respective long L-frame to said tilted position.

7. A lift truck as claimed in claim 1 wherein each long L-frame is coupled with its respective tractor portion solely in said vertical guide means.

8. A lift truck as claimed in claim 1 wherein said vertical guide means is constructed to cooperate with the forward end portion of each short L-frame to support each long L-frame in a forwardly tilted position upon lowering of the respective short L-frame.

9. A lift truck as claimed in claim 8 wherein each vertical guide means comprises a pair of transversely spaced and outwardly facing channels having stop means located therein and an open rear flange portion, each long L-frame being mounted in said channels by upper and lower transversely spaced pairs of guide rollers which straddle said stop means, tilting of the respective long L-frame being effected by lowering of the long L-frame with the respective short L-frame until the upper guide rollers abut said stop means and the lower guide rollers move rearwardly at least partially out of said channels through the rear flange openings thereof.

10. A lift truck as claimed in claim 1 wherein each vertical guide means comprises a pair of transversely spaced channels, each long L-frame being coupled with said channels by upper and lower pairs of guide rollers which normally effects full surface contact between the overlapping portions of the respective short and long L-frames during elevation thereof, and means associated with each vertical guide means permitting tilting movement of each long L-frame upon lowering of the respective short L-frame while said short L-frame remains in a substantially horizontal position and the respective main frame remains fixed in a vertical direction.

11. A lift truck as claimed in claim 1 wherein each short L-frame is normally in full surface contact with the overlapping portion of the respective long L-frame during elevation thereof, and means associated with said vertical guide means permitting tilting movement of each long L-frame upon lowering of the respective short L-frame while said short L-frame remains in substantially horizontal position and the respective main frame remains fixed in a vertical direction.

12. In a dual low powered truck, a tractor drive portion having a main frame, traction drive-steer wheel means supporting said main frame, and a pedestrian operated drive control and steering handle connected to said drive-steer wheel, a tractor non-drive portion having a main frame and caster wheel means supporting said main frame, coupling means connecting said tractor portions in side-by-side relation for operation as a single dual unit truck, vertical guide means supported from a forward end portion of each of said main frames, an L-shaped frame assembly coupled with respective ones of said vertical guide means and extending forwardly thereof, means operatively connected to each L-frame assembly for actuating the same bodily vertically to a transport position in guided relation to said vertical guide means, said vertical guide means being so constructed as to permit each L-frame assembly to tilt forwardly to form a ramp with the floor upon lowering of the L-frame assemblies, and a push-pull attachment supported from each L-frame assembly for engaging floor supported slip sheet pallets when the respective L-frame assembly is thus tilted.

13. A dual low lift powered truck as claimed in claim 12 wherein said coupling means comprises longitudinally spaced elements alternately secured to said tractor drive portion and to said tractor non drive portion.

14. A dual low lift powered truck as claimed in claim 12 wherein an independent control means is provided on each tractor portion for independent control of the respective push-pull attachment associated therewith, and a common control means is provided on one tractor portion for operating simultaneously the pair of push-pull attachments.

* * * * *